United States Patent

[11] 3,609,709

[72] Inventors Walter W. Sanville; John O. G. Darrow, both of Murrysville, Pa.

[21] Appl. No. 825,604
[22] Filed May 19, 1969
[45] Patented Sept. 28, 1971

[73] Assignee Westinghouse Air Brake Company Swissvale, Pa.

[54] FAIL-SAFE MEMORY CIRCUITS
12 Claims, 3 Drawing Figs.

[52] U.S. Cl. .......... 340/173 R, 328/26, 307/261, 330/97
[51] Int. Cl. .......... G11c 11/34, G11c 7/06, G11c 7/02
[50] Field of Search .......... 340/173, 163; 330/97; 328/26, 28, 32; 307/261

[56] References Cited

UNITED STATES PATENTS

| | | | |
|---|---|---|---|
| 3,346,742 | 10/1967 | Aniano et al. | 307/261 X |
| 3,405,286 | 10/1968 | Mudie | 307/261 |
| 3,462,695 | 8/1969 | Townsend et al. | 328/28 X |
| 3,474,265 | 10/1969 | Frantz | 307/261 X |

*Primary Examiner*—Stanley M. Urynowicz, Jr.
*Attorneys*—H. A. Williamson, A. G. Williamson, Jr. and J. B. Sotak

ABSTRACT: This disclosure relates to fail-safe memory circuits for storing information data comprising a source of recurrent signals which is selectively gated by the presence of a storage command signal and a holding command signal, and an amplified means receiving the gated recurrent signals and producing an output when and only when valid information data is stored.

INVENTORS
Walter W. Sanville &
John O. G. Darrow
BY John B. Sotak

INVENTORS
Walter W. Sanville &
John O. G. Darrow.
BY John B. Sotak

FAIL-SAFE MEMORY CIRCUITS

Our invention relates to fail-safe logic circuits and more particularly to memory circuits which operate in a fail-safe manner so that a logic assertion or information bit is unable to be falsely stored due to a malfunction but once stored a valid information bit is capable of being cancelled even during a circuit failure.

In noncritical types of supervisory systems, it is accepted practice to use ordinary conventional binary logic memory circuits such as commercially available bistable devices such as electronic flip-flops for storing information in the form of a binary "0" or a binary "1". However, these prior art electronic information storage circuits are generally limited to standard nonvital usages since they are susceptible to various failures which either produce false information data or prevent the cancellation of the stored information data. In a variety of critical computer and control applications, it is necessary and, in many cases, mandatory to provide digital binary logic circuits which operate in a fail-safe manner. That is, in vital types of systems, such as, automatic vehicle speed control systems and computerized classification yard operations, the information data or stored bits at any given time must truly represent the actual existing condition. Therefore, these memory circuits must not be capable of signifying false conditions which are the result of circuit failures or of system malfunctions. A further operational requirement is the ability to clear or cancel a stored information bit from the memory circuit irrespective of whether or not the circuit is operating properly. Both of these circuit operations are essential not only to the security of the overall system but also to the welfare of the individuals using the system.

Accordingly, it is an object of our invention to provide a fail-safe binary memory circuit.

A further object of our invention is to provide a new and improved logic circuit which operates in a fail-safe manner.

Another object of our invention is to provide an electronic digital logic circuit which is incapable of storing a false information bit but once stored a valid information bit is capable of being cancelled even during a circuit malfunction.

Yet a further object of our invention is to provide a fail-safe transistorized memory circuit in which no false or uncontrollable output can be produced during an internal circuit failure.

Yet another object of our invention is to provide a fail-safe logic circuit which will store binary data only in response to a valid storage command signal and which will always cancel the stored binary data upon removal of a holding command signal.

Still a further object of our invention is to provide a fail-safe memory circuit including a feedback for self-sustaining purposes.

Still another object of our invention is to provide a fail-safe logic circuit which will store information data only during the presence of both a storage command signal and a holding command signal.

Still yet a further object of our invention is to provide a fail-safe digital storage circuit which is reliable and efficient in operation.

Briefly, our invention relates to an electronic binary logic memory circuit which operates in a fail-safe manner to only store a valid information bit but once stored a valid information bit is capable of being cancelled even during the presence of a circuit malfunction.

In a first embodiment of our invention, the fail-safe memory circuit includes a first transistorized "AND" gating circuit having a pair of inputs and an output. A central source of recurrent signals is connected to one of the inputs and a storage command signal is selectively applied to the other of the inputs dependent upon whether or not an information bit is to be stored. The output of the first "AND" gate is coupled to one of a pair of inputs of a second transistorized "AND" gating circuit. A holding command signal is applied to the other of the pair of inputs of the second "AND" gate so that an output is produced when a storage command signal is applied to the other input of the first "AND" gate. The output produced by the second "AND" gate is applied to the input of a transistorized power amplifier. The amplified output from the power amplifier is applied to a voltage doubling network which produces a DC output signal indicative of the valid information bit. A feedback circuit is connected from the output of the voltage doubling network to the other input of the first "AND" gate to maintain storage of the information bit until it is desired to cancel the stored information bit by removing the holding command signal from the other input of the second "AND" gate.

In a second embodiment of our invention, the fail-safe memory circuit includes a local source of recurrent signals in the form of an oscillating circuit. The application of a storage command signal biases the oscillating circuit into conduction for producing an AC output. The AC output generated by the oscillating circuit is applied to one of a pair of inputs of an "AND" gating circuit. A holding command signal forwardly biases the "AND" gate so that AC output signals are available at the output of the "AND" gate. The gated AC signals are applied to a power amplifier for amplification and the amplified AC signals are employed for indicating the storage of a valid information bit. A DC feedback circuit is connected from a voltage doubling rectifier associated with the power amplifier to the DC input of the oscillating circuit for sustained storage of the information bit until positive action is taken to cancel the stored information bit by removing the holding command signal from the "AND" gate.

In a third embodiment of our invention, the fail-safe memory circuit is employed in cab signaling in an automatic speed control system. In this embodiment, a local oscillator is employed for producing alternating current signals when a storage command signal is applied to the DC input of the oscillator. The alternating current signals are applied to the input of an "AND" gating circuit which is forwardly biased to allow passage of the alternating current signals. The alternating current signals are, in turn, applied to the input of a power amplifier and rectifier which amplifies and rectifies the signals to produce a DC output. The DC output which signifies a valid stored information bit is employed to energize an alarm or signal relay which also closes a normally open front contact for completing a feedback circuit to the DC input of the oscillator and the "AND" gate. The information bit will remain stored so long as the holding command signal in the form of the positive operating potential is present. When a coded cab signal is again received, the stored information bit will be cancelled by removing the biasing potential from the "AND" gating circuit and the operating potential from the power amplifier due to the opening of a speed responsive relay contact.

The above objects and other attendant advantages of the present invention will become more fully evident from the following detailed description when considered in connection with the accompanying drawings wherein.

Figure 1:
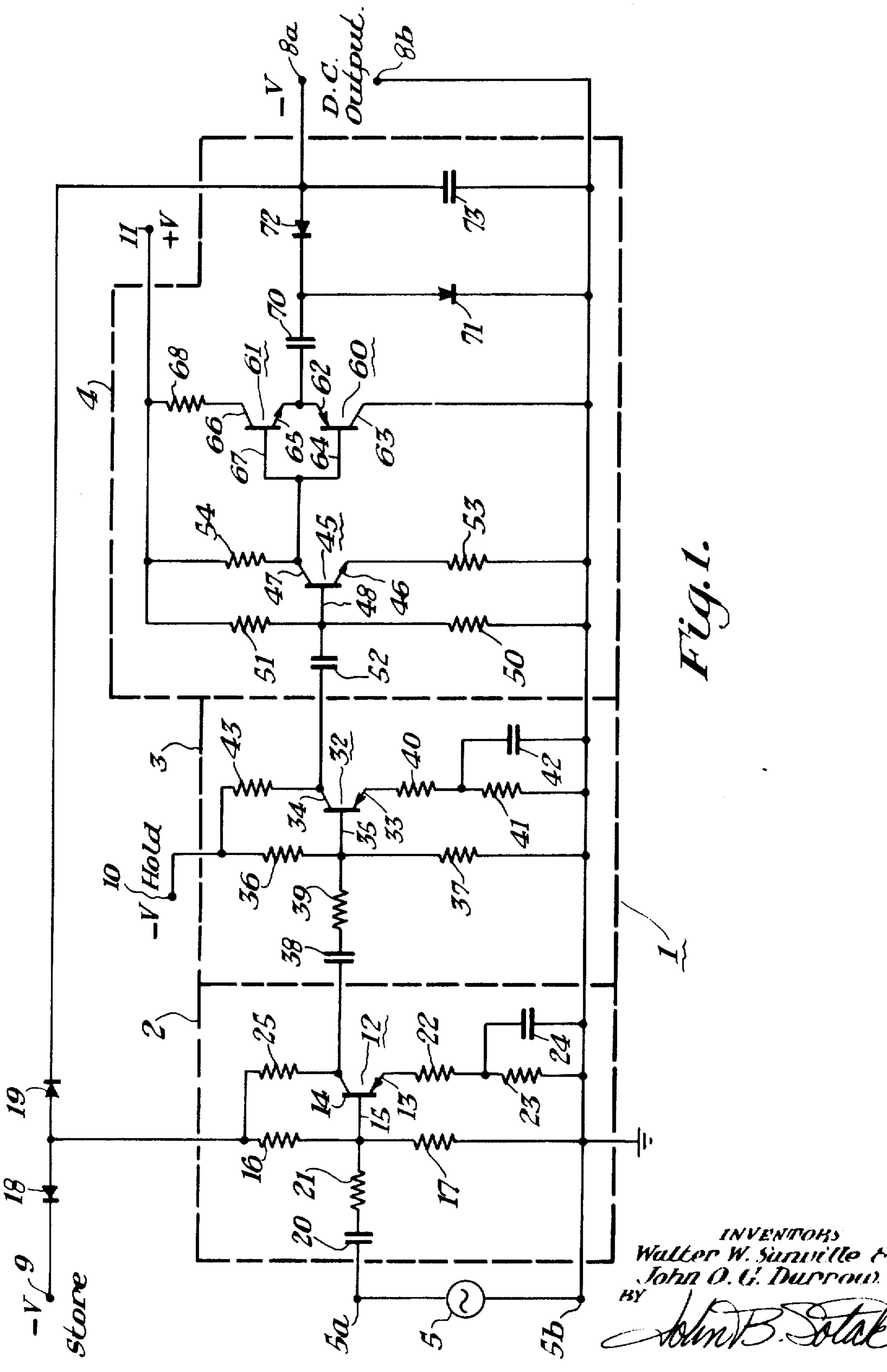
FIG. 1 is a schematic circuit diagram of one embodiment of a fail-safe memory circuit in accordance with our invention.

Referring now to the drawings, and in particular to FIG. 1, there is shown a fail-safe digital memory circuit for storing binary information data in accordance with the presence of a storage command signal and for maintaining the information data in storage until the removal of a "hold" command signal. The memory circuit, which is generally characterized by numeral 1, includes three basic circuits, namely, a first or storage command gate circuit 2, a second or "hold" command gate circuit 3 and an output power amplifier-rectifier circuit 4.

As shown, a suitable recurrent signal source 5 is connected between the upper input terminal *5a* and the common or ground terminal *5b*. It is common practice in digital computer applications to utilize a central signal source for providing AC signals for the various logic circuits, and, therefore, it has been convenient to employ such an AC source for memory circuit 1. However, it is understood that the signal source 5 may be any suitable external AC signal source, such as, produced by any conventional sinusoid or square wave signal generator which may be available for use. The recurrent signals of source 5 are directly applied to input terminals 5*a* and 5*b*, and, as will be described in detail hereinafter, are amplified and rectified to provide a DC output signal indicative of a stored information bit on output terminals 8*a* and 8*b*. A normally off gated "on" type of storage command signal in the form of a negative potential −V is selectively applied to the "store" terminal 9. In a like manner, a normally on gated "off" type of holding command signal in the form of a negative potential −V is selectively removed from the "hold" terminal 10. As shown, the amplifier 4 is also provided with suitable power supply source in the form of a DC potential +V at terminal 11. As will become more readily apparent hereinafter, the advantage of using a positive potential on terminal 11 insures that a failure in the power amplifier is incapable of simulating an output which could falsely represent the storage of an information bit.

The storage command gate 2 takes the form of a signal "-passing" or "AND" gate which requires both the presence of the recurrent signals of source 5 on input terminals 5*a* and 5*b* as well as the presence of the voltage −V on terminal 9. The gating circuit 2 includes a PNP transistor 12 connected in a common-emitter configuration having an emitter electrode 13, a collector electrode 14 and a base electrode 15. As shown, the base electrode 15 of transistor 12 is connected to the junction of a voltage divider formed by resistors 16 and 17. The upper point of resistor 16 is connected to the anode electrode of diode 18 while the cathode electrode of diode 18 is connected directly to "store" terminal 9. Thus, the diode 18 blocks and isolates the "store" terminal 9 from negative feedback voltage, as will be described hereinafter. The upper point of resistor 16 is also connected through a second blocking diode 19 to the output terminal 8*a*. The lower point of resistor 17 is directly connected to the point of reference potential or ground. Accordingly, the resistors 16 and 17 form a suitable biasing network which insures that the transistor operating point is on the linear portion of the dynamic transistor curve so that the transistor 12 will operate linearly. As shown, the upper input terminal 5*a* is connected through a series circuit formed by the coupling capacitor 20 and resistor 21. As will be described in further detail hereinafter, the resistors 21, 16 and 17 form an input resistive attenuating network for reducing the magnitude of the AC signals applied between the input terminals 5*a* and 5*b*. The emitter electrode 13 of transistor 12 is shown connected to ground potential by means of a pair of series resistors 22 and 23, respectively. A suitable capacitor 24 is connected across resistor 23 to limit AC degeneration to that caused by resistor 22. A load resistor 25 is connected from the collector electrode 14 to the upper point of resistor 16. The collector electrode 14 is connected to the input terminal for the succeeding gating circuit 3, as will be described presently.

As previously mentioned, the parameters for the circuit including transistor 12 have been selected to provide class A or linear operation. Further, it will be noted that the voltage gain of the amplifier is essentially determined by the ratio of the resistive value of resistor 25 over the resistive value of resistor 22. In the present instant the magnitudes of resistors 25 and 22 have been chosen and so proportioned to provide an amplification factor of 10. As previously mentioned, the resistors 16, 17 and 21 form an input resistive attenuating network for the AC signals appearing on terminals 5*a* and 5*b* and the relative magnitudes of these resistors are so proportioned to provide or reduce the input signals applied to terminals 5*a* and 5*b* by a factor of 10. Accordingly, the "AND" gating circuit 2 operates as a fail-safe unity gain device during its signal "-passing" mode of operation, as will be described hereinafter.

As previously mentioned, the output from the "AND" gate 2 is connected to the input of the fail-safe "AND" gating circuit 3. As noted, the "AND" gating circuit 3 also includes a PNP transistor 32 having an emitter electrode 33, a collector electrode 34 and a base electrode 35 and is substantially identical to the "AND" gating circuit 2, both in circuit detail as well as in operation. The collector 14 of transistor 12 is connected to the base electrode 35 of transistor 32 through a series circuit formed by coupling capacitor 38 and current-limiting resistor 39. The base electrode 35 of the transistor 32 is also connected to the junction of a voltage divider network formed by resistors 36 and 37. The emitter electrode 33 of transistor 32 is connected to ground potential through the series connected resistors 40 and 41. A signal bypassing capacitor 42 is connected across resistor 41. A collector load resistor 43 is connected from the collector electrode 34 to the upper point of the resistor 36 which in turn is connected directly to the "hold" terminal 10. The negative potential −V is normally applied to the "hold" terminal 10 and is only removed when it is desired to cancel a stored information bit from the memory circuit 1, as will be described hereinafter. Like gate 2, the common-emitter "AND" gate 3 is a unity gain device so that the magnitude of the output signals available on its collector electrode 34 is substantially the same as that appearing on collector electrode 14.

Output signals from the "AND" gating circuit 3 are applied to the input for the power amplifier 4 which comprises a two-stage amplifier and a voltage doubling network. As shown, the first stage comprises an NPN transistor 45 having an emitter electrode 46, a collector electrode 47, and a base electrode 48. The base electrode 48 is connected to the junction of a voltage divider network comprising a pair of resistors 50 and 51. As shown, the base electrode 48 is connected to ground through the resistor 50 and also to the positive terminal 11 of a main voltage supply source through resistor 51. The base electrode is also connected to the collector electrode 34 of transistor 32 by a coupling capacitor 52. The emitter electrode 46 of transistor 45 is connected to ground potential by resistor 53 while the collector electrode 47 is coupled by a load resistor 54 to the positive supply terminal 11. The second stage of the power amplifier 4 includes a pair of complementary type of transistors 60 and 61. The transistor 60 is a PNP type while the transistor 61 is an NPN type. The PNP transistor 60 includes an emitter electrode 62, a collector electrode 63, and a base electrode 64. Similarly, the NPN transistor 61 includes an emitter electrode 65, a collector electrode 66, and a base electrode 67. As shown, the base electrodes 64 and 67 of transistors 60 and 61, respectively, are directly connected together and, in turn, directly coupled to the collector electrode 47 of transistor 45. The collector electrode 63 of transistor 60 is directly coupled to ground potential while the collector electrode 66 of transistor 61 is connected by a current-limiting resistor 68 to the positive potential +V. The emitter electrodes 62 and 65 of the transistors 60 and 61, respectively, are interconnected and provide an output terminal for the subsequent voltage doubling network.

The voltage doubling network is a fail-safe voltage rectifier or half-wave voltage doubler and includes a series charging capacitor 70, a pair of diode rectifiers 71 and 72, and a doubler charging capacitor 73. As shown, the series charging capacitor 70 has one end connected to the emitter electrodes of transistors 60 and 61 and has the other end connected to the junction of the series connected diode rectifiers 71 and 72. The cathode of the diode rectifier 71 is connected to ground potential while its anode is connected to the cathode of the diode 72. The anode of diode 72 is connected to one end of the doubler charging capacitor 73 while the other end of the diode 71 is shown connected to ground potential. As shown, the output terminals 8*a* and 8*b* are directly connected across the capacitor 73. It will also be noted that a portion of the output is fed back through a feedback loop extending from the upper terminal 8*a* through the diode 19 to the upper junction of the resistor 16. The blocking diode 19 insures that no current flows from the negative potential input terminal 9 to the output terminal 8*a*.

Turning now to the operation, it will be assumed that the memory circuit 1 is in a quiescent condition and that no storage command signal is present on "store" terminal 9. However, it will be understood that AC signals are applied from source 5 to input terminals 5*a* and 5*b*, that the holding command signal is present on "hold" terminal 10 and that the positive potential +V is connected to the main supply terminal 11. Under such an assumed condition, it will be seen that no output voltage will appear across terminals 8*a* and 8*b* since the "AND" gate 2 is unable to pass the AC signals due to the absence of the necessary DC biasing on terminal 9. That is, when the negative potential −V is not applied to the "store" terminal 9, it is readily noted that no supply potential is available at the collector electrode 14 and no negative voltage is available for establishing the baising requirements of the transistor 12. Obviously under such a condition, the gain characteristics of the amplifier are destroyed and the transistor cannot amplify the AC input signals. Further, since the attenuating network is effective in normally reducing any AC input signals appearing on terminals 5*a* and 5*b* by a factor of 10, no gain is available for overcoming this reduction in the input signal level. Accordingly, under this condition no AC input signal is applied to the second "AND" gate 3 and even though the negative holding potential is present on the "hold" terminal 10 no AC signals are available at its collector electrode 34. With no AC signals available at the collector electrode 34 of transistor 32, no input is applied to the first stage and, in turn, the second stage of the power amplifier. Accordingly, no voltage doubling effect takes place and, in turn, no negative output potential is available on terminals 8*a* and 8*b*.

Further, it will be observed that no circuit or component failure can result in a negative potential appearing across output terminals 8*a* and 8*b* at this time. For example, it will be noted that neither a short-circuited nor an open-circuited condition of transistor 12 or 32 will produce or permit AC output signals to be generated and applied to the input of the power amplifier 4. That is, a shorted transistor in either of these circuits causes the loss of the necessary gain for overcoming the AC signal reduction which results in each of the resistive attenuating networks while an open circuited condition destroys the amplification characteristics of the transistors 12 and 32 so that the necessary gain for overcoming the attenuation factor is no longer present. Thus, no AC output signals are available at collector electrode 34 when either transistor fails. Further, it will be noted that the opening of the resistors, capacitors or interconnecting leads either results in the loss of the required gain, the necessary bias or the input signals for producing AC signals on the collector electrode 34. Further, the shorting of the capacitors 24 and 42 drives the respective transistor into heavy saturation so that no AC signals are possible during such a malfunction. The resistors 21, 22, 39 and 40 are preferably carbon composition resistors so that the chance of these resistors shorting is highly improbable, if not impossible. The opening of either capacitor 20 or 38 is a safe failure while the shorting of these capacitors is not necessarily a critical failure since an AC signal source must be initially applied to the input terminals before any output is available at the collector electrode 34. Thus, it can be seen that failures of either the active or passive elements of each of the "AND" circuits are incapable of producing an erroneous or false output signal and, therefore, each of these gating circuits operates in a fail-safe manner.

In a like manner, no circuit or component failure in the power amplifier and rectifier circuit 4 is capable of providing a negative voltage on terminal 8*a* to thereby falsely indicate the storage of an information bit. The safe operation of the power amplifier has been ensured by requiring that the main supply voltage on terminal 11 be of the opposite polarity type to that representative of a valid stored information bit; that is, since the power amplifier has a positive polarity with respect to ground while the output terminal 8*a* requires negative polarity with respect to ground, false information data cannot be simulated across the output terminals. Thus, during the absence of any AC signals on the input of the power amplifier, a short-circuited or open-circuited active or passive component within the power amplifier and rectifier is incapable of resulting in a negative voltage appearing on terminal 8.

Thus, it can be seen that under no circumstances can a negative polarity voltage be developed on terminal 8*a* in the absence of a storage command signal on "store" terminal 9.

Let us now assume that is is desirous to register or store an information bit in the form of a negative DC voltage on output terminal 8*a*, which in the present case may be defined as binary "1" or logical assertion, for energizing a suitable utilization device, such as, either a polar sensitive relay or any subsequent logic circuit requiring negative potential. As previously mentioned, the storage of binary information data is initiated by simply applying a storage command signal in the form of a negative potential −V on the "store" terminal 9. With the application of the negative potential −V on terminal 9, the necessary DC operating voltages for the transistor 12 of the "AND" gate 2 is accomplished, that is, the emitter-base electrodes are forward biased while the emitter-collector electrodes are reverse biased. THus, output recurrent or AC signals 5 will appear at the collector electrode 14 of transistor 12 but shifted 180°. These AC signals are in turn applied to the base electrode 35 of transistor 32 and it will be noted that the AC signals are again phase shifted 180° and now will appear in phase with the input signals of source 5. That is, since the "-hold" command signal or operating potential is normally present on terminal 10, the application of the AC signals on the base electrode 35 will result in the passage of the AC signals. The AC signals are, in turn, applied to the base electrode 48 of transistor 45 and will appear as an inverted amplified signal on collector electrode 47. It is understood that since the transistors 60 and 61 have an initial zero emitter-base bias, these transistors operate as class B amplifiers. Thus, the positive alternations of the AC signal forwardly bias the transistor 61 and cause it to conduct while negative alternations of the AC signal forwardly bias the transistor 60 and cause it to conduct. It will be appreciated that while one transistor is conducting, the other transistor is not conducting since the input signal will alternately forwardly bias one transistor while reverse biasing the other transistor. If we now assume that a positive alternation appears on collector electrode 47, it will be seen that transistor 61 is rendered conductive due to the positive biasing voltage appearing on base electrode 67. The conduction of NPN transistor 61 causes a circuit path to be established from the positive supply terminal 11 through current-limiting resistor 68, which reduces the initial current surge, through collector and emitter electrodes 66, 65, respectively, of transistor 61 through capacitor 70, through diode 71 to ground. Thus, a charging circuit is established for capacitor 70 and the left-hand plate will become positively charged to substantially the peak value of the input signal. Now when the negative alternation appears on collector 47, the PNP transistor 60 is rendered conductive while the NPN transistor 61 is rendered nonconductive. Thus, a discharge circuit path for capacitor 70 is completed through the emitter-collector electrodes of transistor 60 and diode 72 to the capacitor 73 so that a negative potential having twice the peak voltage value of the AC input signals is available at the output terminal 8*a*.

It will be appreciated that the memory circuit 1 is self-sustaining due to the feedback path established by diode 19 to the input of the first "AND" gate circuit 2. Thus, the memory circuit 1 will retain the stored information data after the storage command signal is applied from the "store" terminal 9. The memory circuit 1 will continue to operate in the above described manner to produce a stored binary "1" until some appropriate action is taken to cancel the data from the memory circuit.

While it is common practice in previous types of memory circuits to apply an "erase" or "reset" signal, such operation requires the presentation or application of a signal. It has been found that this previous method of cancelling stored information data is not only unsatisfactory but also unsafe since the application of an "erase" or "reset" signal cannot be ensured and guaranteed. Thus, in previous types of memory logic circuits, a simple disconnected lead or a single failure in the circuit can result in the inability to cancel the stored information bit from the memory circuit. It has been found that by employing an inverse command signal, such as, a holding command signal which requires removal rather than reception, cancellation of the stored information bit from the memory circuit 1 can always be ensured. Therefore, in the presently described memory circuit 1, the removal of the holding command signal −V from the "hold" terminal 10 will cause the fail-safe "AND" circuit 3 to block the recurrent AC signals appearing on base electrode 35. That is, when it is desirable to cancel the stored information bit from the memory circuit 1, it is simply necessary to remove the negative holding command signal from terminal 10, which thereby results and prevents AC signals from being applied to the first stage of the power amplifier, in turn removes the negative potential from the output terminal 8a. Thus, it can be seen that the circuit memory 1 operates in a fail-safe manner so that a false information bit is incapable of being stored but that, once stored, a valid information bit can be cancelled even during a circuit malfunction.

Figure 2:
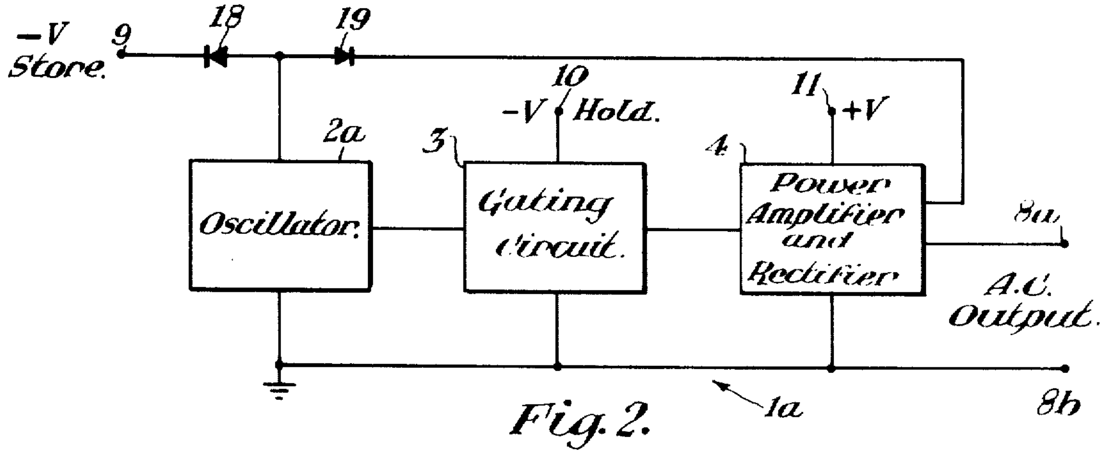
FIG. 2 is a block diagram of a second embodiment of a fail-safe memory circuit in accordance with our invention.

Turning now to FIG. 2, there is shown a second embodiment of a fail-safe memory logic circuit 1a in accordance with our invention in which a local recurrent signal source is employed to produce an AC output indicative of a stored information bit. In certain applications, there is no central AC supply source readily available for use and, therefore, it is necessary to provide a local source of AC signals. Further, it has been found highly advantageous, in cases where only a few bits of storage are required, to provide a separate internal AC signal source, such as oscillator 2a, for the fail-safe memory circuit. The oscillator 2a may be of any conventional type which is capable of generating continuous AC signals of a predetermined frequency and known amplitude whenever appropriate biasing voltage is supplied from a suitable potential source. That is, the oscillator 2a is incapable of producing oscillations until a negative voltage −V is initially applied to the oscillator in response to a storage command signal. Like in FIG. 1, the storage command signal applied to "store" terminal 9 is connected to the oscillator 2a by a blocking diode 18. The output of the oscillator 2a is fed into a fail-safe "AND" gating circuit 3 which has a holding command signal in the form of a negative potential −V applied to "hold" terminal 10, the same as in FIG. 1. The output of the "AND" gating circuit is connected to the input of the power amplifier and rectifier 4 which includes a positive potential +V main supply source applied to terminal 11. Each of the respective circuits is connected to common ground potential, and an output signal from the memory circuit 1a is derived across output terminals 8a and 8b. It will be noted that in the memory circuit 1a of FIG. 2, an AC output is delivered across terminals 8a and 8b for controlling any suitable utilization device (not shown). Like in FIG. 1, a feedback path is interconnected from the voltage doubling rectifier network of the power amplifier and rectifier 4 to the input of oscillator 2a so that once a storage command signal is applied to terminal 9, the feedback voltage will sustain validly stored information data after the command storage signal on terminal 9 is removed. Similarly, like in FIG. 1, cancellation of the stored information data, namely, the removal of the AC output across terminals 8a and 8b, can be readily accomplished by simply removing the holding command signals from the "hold" terminal 10. It will be understood that the specific circuit details and functional operation of the memory circuit 1a of FIG. 2 with the exception of the oscillator 2a are the same as those described in FIG. 1. Accordingly, the AC signal output may be conveniently taken and derived from the common-emitter junction of the complementary transistors 60 and 61 which are substantially identical to those shown in FIG. 1. It will be appreciated that in some applications it may be desirable to provide a DC output from FIG. 2 and thus the output terminal 8a would be connected to the voltage doubling network as shown in FIG. 1, and vice versa.

Figure 3:
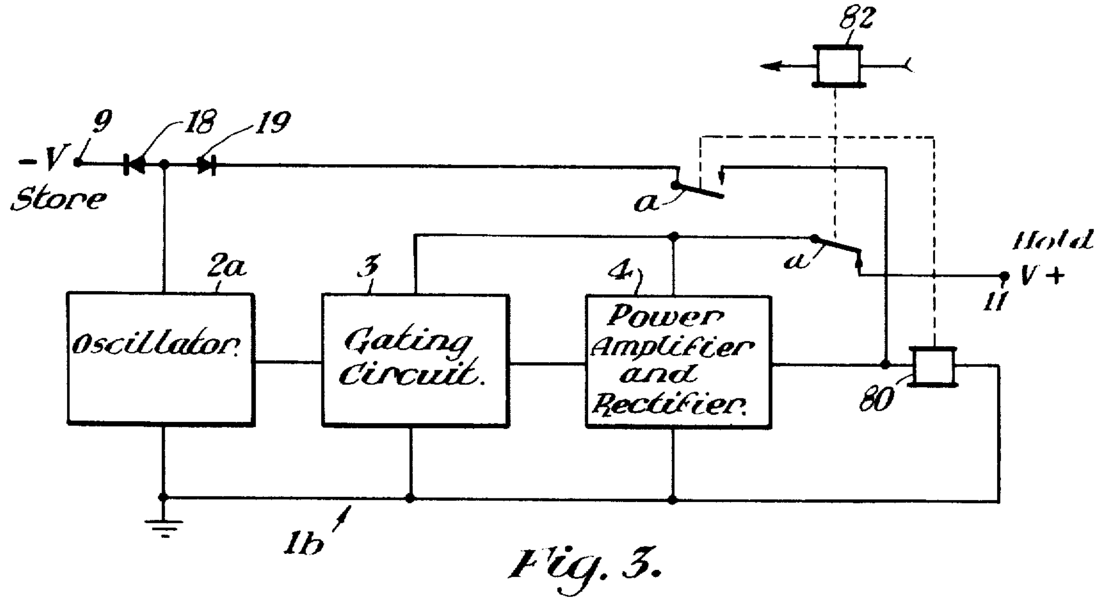
FIG. 3 is a block diagram of a third embodiment of a fail-safe memory circuit in accordance with our invention as employed in an automatic speed control system.

Referring now to FIG. 3, there is shown a memory logic circuit 1b operating in conjunction with cab signaling of an automatic speed control system. In certain automatic speed control systems, coded cab signals are employed to inform the motorman of the maximum authorized speed for each given track section. The signals are generally inductively coupled through the running rails to receiving coils carried by the moving vehicle. These signals will change, of course, in accordance with the different authorized speeds as the vehicle moves along its route. However, in certain track sections along the route, no coded cab signals will be received due to, for example, the presence of another train. Accordingly, the vehicle motorman must be alerted of such a situation so that certain protective measures, namely, stop and proceed at a reduced restricted speed, may be taken. However, in order to provide efficient and reliable operation, it is necessary and highly advantageous to remove the reduced speed restriction from the vehicle and allow it to proceed at the normal authorized speed as soon as a cab signal speed command is received again. Therefore, the operator not only must be promptly informed of a reduced speed restriction but also must be quickly notified of the removal of the restrictive speed restriction for overall efficient operation. It will be appreciated that such operation of the system calls for a unique memory circuit which will promptly store the restrictive speed information data as well as will quickly cancel the stored information data in a fail-safe manner.

The necessary function and operation for controlling the cab signal equipment is accomplished by the fail-safe memory circuit 1b which includes a suitable oscillator 2a, a gating circuit 3, and a power amplifier and rectifier 4. Like in FIG. 2, the oscillator 2a will only produce oscillations when a suitable negative potential −V is applied to terminal 9 by the cab signal equipment. As shown, the negative storage command signal −V is produced by suitable separate means when the vehicle is brought to a complete stop. The storage command signal appearing on terminal 9 is applied via diode 18 to the DC input of oscillator 2a. In the presently described memory circuit, a positive potential holding command signal from the main supply terminal 11 operates as the forward biasing and supply voltage for the "AND" gating circuit 3. That is, the "AND" gate 3 utilizes an NPN transistor so that a positive potential source is necessary for rendering the transistor conductive. The output from the oscillator 2a is connected to the AC input of the "AND" gating circuit 3 while the AC output of the "AND" gating circuit is applied to the input of the power amplifier 4. The rectified DC output of the power amplifier and voltage doubling rectifier network 4 is employed to energize a suitable output device, such as, a polar sensitive relay 80. As shown, the relay 80 is mechanically connected to a normally open back contact *a* which is interposed in the feedback loop coupled from the output of the power amplifier and rectifier 4 to the DC input to the oscillator 2a via diode 19. A plurality of speed responsive relays, only one of which is shown for convenience at relay 82, are selectively energized in response to the different speed command signals received by the vehicle-carried cab signaling equipment. As shown, the relay 82 includes a back contact *a* which is closed when the relay 82 is deenergized to interconnect from the main supply source voltage +V to the "AND" gate 3 and the power amplifier-rectifier 4. It will be appreciated that the other speed responsive relays also have back contacts each of which is connected in series relationship so that the presence of any one of a given number of speed command signals will interrupt the circuit from terminal 11. In the presently described memory circuit 1b, the voltage on terminal 11 operates as the holding command signal so that the opening of contact *a* of relay 82 will effectively cancel the information data stored by memory circuit 1b. That is, when the speed command relay 82 is energized due to the reception of a valid speed command signal, the contact *a* of relay 82 is opened so that no biasing voltage is available for "AND" gate 3 and no supply voltage is available for the power amplifier and rectifier 4.

Let us now assume that the moving vehicle enters a section of track that is absent of any coded speed command signal. Under this condition, the relay 82 becomes deenergized so that its back contact *a* closes. The absence of speed command signal causes an alarm signal to be generated, thereby notifying the motorman to manually stop the vehicle or emergency braking will be instituted. When the vehicle is completely stopped, a storage command signal in the form of a negative voltage −V is applied to the "store" terminal 9 by the vehicle-carried apparatus. The negative voltage on terminal 9 causes the oscillating circuit 3 to begin oscillating. The closing of contact *a* of relay 82 establishes a circuit from terminal 11 to gate 3 and an amplifier-rectifier 4, and thus provides the necessary DC biasing voltage for the "AND" gating circuit 3 and power-rectifier 4. The generated oscillations are passed by the "AND" gating circuit and are directly fed into the power amplifier and rectifier 4. These AC signals are first amplified and then rectified to provide a DC voltage having an amplitude equal to the peak to peak value of the amplified AC signals. As previously mentioned, the DC output is employed for energizing the relay 80 which causes its front contact *a* to close and latch the feedback loop to DC input of the oscillator **2*a* and thereby maintaining storage of the information data. The relay 80 may also operate other contacts, not shown, which control warning or alarm circuits for informing the motorman of the absence of a coded speed command signal. This condition will remain until the vehicle again enters a section of track having a specific coded speed command signal. Upon reception of a valid speed command signal, the relay 82** is again energized so that it opens its back contact *a*. The opening of back contact *a* of relay 82 causes cancellation of the stored information data due to the interruption of the main supply source to the power amplifier and rectifier 4. Thus, the unique memory circuit **1*b* of FIG. 3** provides a new and improved method of storing information data in cab signal equipment in a fail-safe manner.

It will be appreciated that while our invention finds particular utility in computer and speed control systems, it is readily evident that the invention is not merely limited thereto but may be employed in various other systems and apparatus wherein similar conditions exist, and the need for fail-safe operation is required. Regardless of the manner in which the invention is used, it is understood that various alternations, modifications and changes may be made by persons skilled in the art without departing from the spirit and scope of this invention.

Having thus described our invention, what we claim is:

1. A memory circuit which operates in a fail-safe manner comprising, first fail-safe circuit means for producing recurrent signals in response to the presence of a storage command signal, second fail-safe circuit means coupled to said first circuit means for passing said recurrent signals received from said first circuit means, and third fail-safe circuit means coupled to said second circuit means for amplifying said recurrent signals passed by said second circuit means and for producing an output signal which is indicative of a valid stored information bit when and only when no critical circuit or component failure is present.

2. A memory circuit as defined in claim 1 wherein said first circuit means includes a first gate circuit and an external source of recurrent signals.

3. A memory circuit as defined in claim 1 wherein said first circuit means includes an oscillating circuit for producing said recurrent signals.

4. A memory circuit as defined in claim 1 wherein said second circuit means includes an "AND" gate which passes said recurrent signals only during the presence of a DC holding signal and in the absence of a circuit malfunction.

5. A memory circuit as defined in claim 1 wherein a feedback means is coupled from said third circuit means to said first circuit means for sustaining storage of the information bit in said memory circuit.

6. A memory circuit as defined in claim 5 wherein said feedback means includes a blocking diode serially connected between said first and said third circuit means.

7. A memory circuit as defined in claim 5 wherein said feedback means includes a controllable switching means connected between said first and said third means.

8. A memory circuit as defined in claim 7 wherein said controllable switching means comprises a normally open contact of a relay which is controlled by the output signal produced by said third circuit means.

9. A memory circuit as defined in claim 5 wherein said third circuit means produces an AC output signal indicative of the stored information bit and produces a DC feedback signal for sustaining storage of the information bit.

10. A memory circuit as defined in claim 1 wherein said storage command signal is a DC voltage signal.

11. A memory circuit as defined in claim 10 wherein said third circuit means includes a DC voltage supply which is of the opposite polarity of said DC voltage signal so that failure of said third circuit means is incapable of simulating a valid information bit.

12. A memory circuit as defined in claim 11 wherein said DC voltage supply of said third circuit means includes a switching device for providing a controllable holding signal for the memory circuit.